United States Patent
Cuttell et al.

(10) Patent No.: US 10,019,761 B2
(45) Date of Patent: Jul. 10, 2018

(54) SYSTEM AND METHOD FOR VIRTUAL INSPECTION OF A STRUCTURE

(71) Applicant: STATE FARM MUTUAL AUTOMOBILE INSURANCE COMPANY, Bloomington, IL (US)

(72) Inventors: Matthew Cuttell, Bloomington, IL (US); Timothy Kiper, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 1001 days.

(21) Appl. No.: 14/262,102

(22) Filed: Apr. 25, 2014

(65) Prior Publication Data
US 2015/0310558 A1    Oct. 29, 2015

(51) Int. Cl.
*G06Q 40/08*      (2012.01)
*G06Q 30/02*      (2012.01)
*G06K 9/00*      (2006.01)

(52) U.S. Cl.
CPC ......... *G06Q 40/08* (2013.01); *G06K 9/00637* (2013.01); *G06Q 30/0278* (2013.01)

(58) Field of Classification Search
CPC ........ G06Q 10/00; G06Q 20/00; G06Q 30/00; G06Q 40/00
USPC ...................................................... 705/3-44
See application file for complete search history.

(56) References Cited

U.S. PATENT DOCUMENTS

| | | | | |
|---|---|---|---|---|
| 8,260,274 B2* | 9/2012 | Moshir | ................... | G06F 21/35 455/414.3 |
| 8,271,308 B2* | 9/2012 | Winkler | ............... | G06Q 10/087 340/572.8 |
| 8,285,564 B2* | 10/2012 | Perkins | ................... | G06Q 10/06 705/2 |
| 8,666,786 B1* | 3/2014 | Wirz | ...................... | G06Q 40/08 705/30 |
| 8,731,999 B2* | 5/2014 | Nielsen | ................... | G06Q 10/06 324/326 |
| 8,903,416 B1* | 12/2014 | Perkins | ................. | H04W 4/008 340/572.1 |
| 9,098,870 B2* | 8/2015 | Meadow | ................... | G06K 9/32 |
| 9,185,176 B2* | 11/2015 | Nielsen | ................... | G06Q 10/06 |
| 2003/0177187 A1 | 9/2003 | Levine et al. | | |
| 2003/0233278 A1 | 12/2003 | Marshall | | |

(Continued)

OTHER PUBLICATIONS

Office Action in U.S. Appl. No. 14/262,037 dated Jul. 27, 2017.
(Continued)

*Primary Examiner* — Frantzy Poinvil
(74) *Attorney, Agent, or Firm* — Marshall, Gerstein & Borun LLP; Randall G. Rueth

(57) ABSTRACT

A computer implemented method for linking an underwriting action to a customer is presented. The method receives an inspection model corresponding to a geographic location associated with a structure and determines that a virtual inspection is necessary based on the inspection model. The method also retrieves a first aerial image corresponding to the geographic location and a second aerial image corresponding to the geographic location and a time threshold. The method further receives a comparison data value corresponding to the first and second aerial image, determines an underwriting action based on the comparison data and links the underwriting action to a customer account.

6 Claims, 8 Drawing Sheets

(56) References Cited

U.S. PATENT DOCUMENTS

| | | | |
|---|---|---|---|
| 2005/0034074 A1 | 2/2005 | Munson et al. | |
| 2005/0251427 A1* | 11/2005 | Dorai | G06Q 40/08 705/4 |
| 2007/0150130 A1 | 6/2007 | Welles et al. | |
| 2007/0185906 A1 | 8/2007 | Humphries et al. | |
| 2008/0133671 A1 | 6/2008 | Kalaboukis | |
| 2011/0137685 A1* | 6/2011 | Tracy | G06Q 40/08 705/4 |
| 2012/0046975 A1* | 2/2012 | Stolze | G06Q 30/02 705/4 |
| 2013/0061156 A1 | 3/2013 | Olsen et al. | |
| 2013/0110558 A1 | 5/2013 | Maher | |
| 2013/0179373 A1 | 7/2013 | Mutchnik et al. | |
| 2014/0132409 A1 | 5/2014 | Billman et al. | |
| 2014/0173001 A1 | 6/2014 | Cashman et al. | |
| 2014/0257862 A1 | 9/2014 | Billman et al. | |
| 2014/0280269 A1 | 9/2014 | Schultz et al. | |
| 2014/0283086 A1 | 9/2014 | Schultz et al. | |
| 2014/0297065 A1 | 10/2014 | Tofte et al. | |
| 2015/0106131 A1 | 4/2015 | Woods et al. | |

OTHER PUBLICATIONS

Office Action in U.S. Appl. No. 14/262,037 dated Oct. 31, 2014.
Office Action in U.S. Appl. No. 14/262,037 dated Mar. 31, 2015.
Office Action in U.S. Appl. No. 14/262,037 dated Sep. 11, 2015.
Office Action in U.S. Appl. No. 14/262,037 dated Apr. 5, 2016.
Office Action in U.S. Appl. No. 14/262,037 dated Sep. 9, 2016.
Office Action in U.S. Appl. No. 14/262,037 dated Mar. 23, 2017.

* cited by examiner

SYSTEM AND METHOD FOR VIRTUAL INSPECTION OF A STRUCTURE

FIELD OF THE DISCLOSURE

The present disclosure generally relates to a system and method for virtual inspection of a structure by company employees in an insurance quote and underwriting processes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditionally, in order for insurance underwriters to properly make decisions concerning insurance products, a physical inspection of a structure or property is often necessary. For example, the underwriter may need to know the condition of a structure, information about the property surrounding (such as liability concerns, fire hydrants, etc.), assess damage to the structure, or determine whether the proper structure is on the property Traditionally, this inspection process required a company employee to physically travel to the location in question and physically inspect the property. Physical inspections are labor intensive, time-consuming, expensive and usually focus on the exterior physical characteristics of a home as well as liability exposures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer implemented method for linking an underwriting action to a customer account includes receiving, via a computer network, an inspection model, wherein the inspection model corresponds to a geographic location associated with a structure and determining, at one or more processors, that a virtual inspection is recommended based on the inspection model. The method may also include retrieving, via the computer network, a first aerial image, wherein the first aerial image corresponds to the geographic location and a second aerial image, wherein the second aerial image corresponds to the geographic location and a time threshold. The method further includes receiving a comparison data value corresponding to the first and second aerial image, determining, at the one or more processors, an underwriting action based on the comparison data and linking, at the one or more processors, the underwriting action to a customer account.

Figure 1:
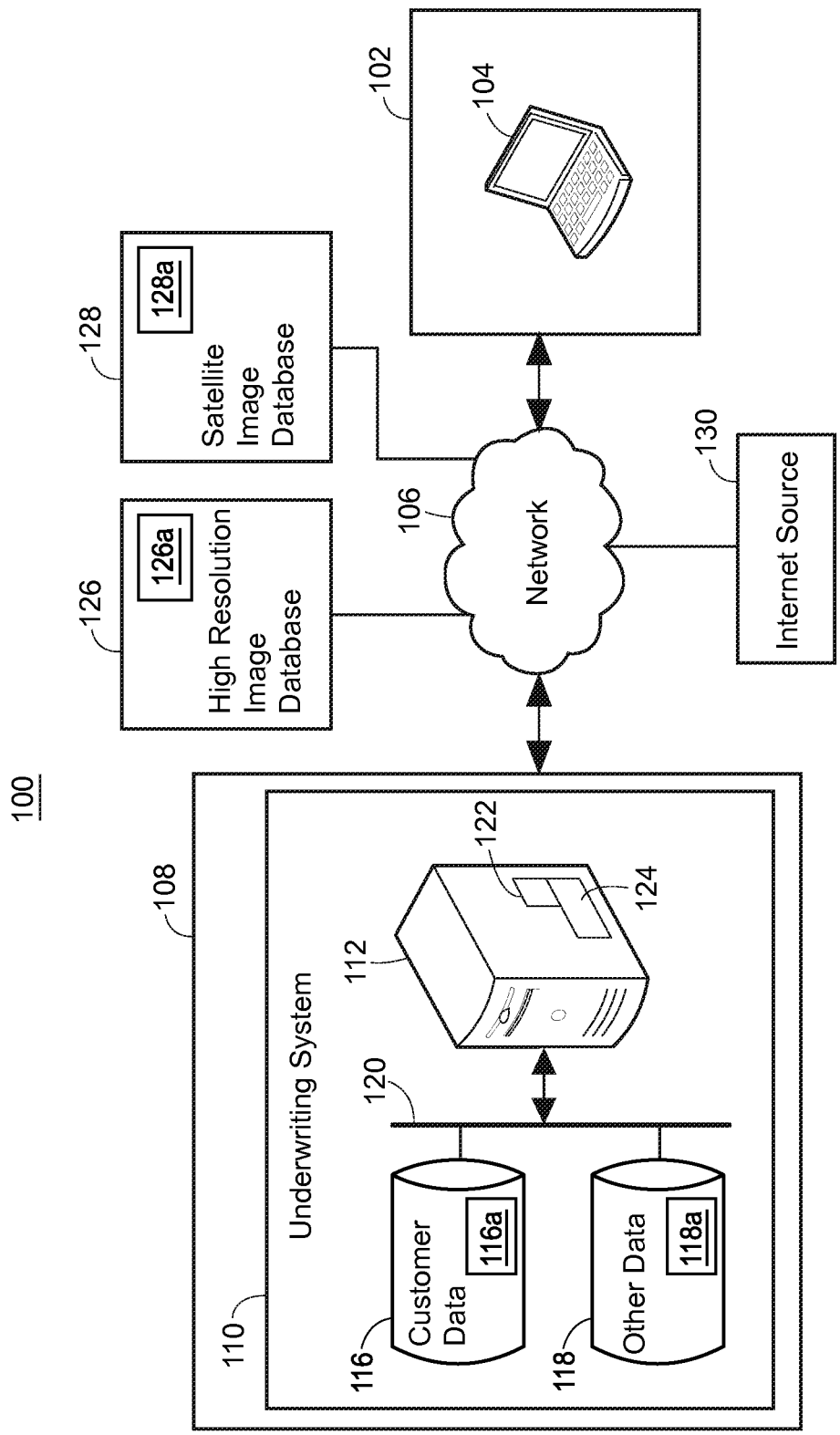
FIG. 1 is a simplified and exemplary block diagram of a system for virtual inspection of a structure.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Traditionally, aerial images were not reliable due to their age, availability, and resolution. Because of these limitations, the actions that underwriters could take based on them alone has been limited. For example, underwriters can compare these photos with agent submitted photos for more information, or to identify exposures that may not have been included in other available photos. If there is a problem identified, however, underwriters must still request a physical inspection, or must communicate concerns to an agent to resolve issues. Due to the above-mentioned current limitations, adverse underwriting action was limited based on aerial imagery alone. Instead, aerial imagery is an input into a larger process for underwriting action.

The systems and method of aerial imaging described herein provide underwriters a tool that utilizes multiple forms of aerial image technology to enable underwriters to make decisions and take underwriting action without having to transfer applications to other works queues. The system provides underwriters with streamlined access to high-resolution aerial imagery that enable access to low-level details on an individual property regarding exterior physical characteristics and potential liability hazards on the property. The systems and methods presented further provide underwriters access to recent satellite images in order to check the validity or current state of a property. Although the satellite images are not as high-resolution, the satellite images can be cross-referenced with the high resolution images in order to determine significant changes in the physical characteristics of the home, such as the presence of liability hazards on the property, room additions, etc.

The innovation discussed herein utilizes aerial imaging technology to incorporate the ability for an underwriter to take action on a policy solely based on the aerial imagery. By combining highly reliable aerial imagery with up to date lower-resolution satellite imagery, the system is designed to allow an underwriter to quickly and efficiently determine whether a physical inspection, virtual inspection, or no inspection is necessary.

FIG. 1 illustrates various aspects of an exemplary architecture for implementing a virtual inspection system 100. The high-level architecture includes both hardware and software applications, as well as various data communications channels for communicating data between the various hardware and software components. The virtual inspection system 100 may include various software and hardware components or modules that may employ a method to analyze and process images, such as satellite images, high resolutions images and other types of images. The various modules may be implemented as computer-readable storage memories containing computer-readable instructions (i.e., software) for execution by a processor of the intelligent aerial image data processing system 100.

The virtual inspection system 100 may include front end components 102, including a computing device 104 that may execute instructions for performing a quote application process. The computing device 104 may include a personal computer, smart phone, tablet computer, or other suitable computing device. Those skilled in the art will recognize that the present system may be used in a dedicated application, a web browser, a combination thereof, etc.

In some embodiments, the computing device 104 connects to a computer network 106, such as the Internet or other type of suitable network (e.g., local area network (LAN), a metropolitan area network (MAN), a wide area network (WAN), a mobile, a wired or wireless network, a private network, a virtual private network, etc.). The computing device 104 may connect to back end components 108 via the computer network 106.

The back end components 108 may include an underwriting system 110 that assists an underwriter with the underwriting process. The underwriting system 110 includes an underwriting server 112 that may include computer-executable instructions to instantiate an aerial image retrieval tool 122 and an aerial image analysis tool 124. The quote system 110 may also include a customer data base 116 that stores data 116a associated with a customer. The customer database 116a may include a data storage device such as random-access memory (RAM), hard disk drive (HDD), flash memory, flash memory such as a solid state drive (SSD), etc. The quote system 110 may further include one or more additional databases 118 for storing other data 118a. The back end components may communicate with each other through a communication network 120 such as a local area network or other type of suitable network (e.g., the Internet, a metropolitan area network (MAN), a wide area network (WAN), a mobile, a wired or wireless network, a private network, a virtual private network, etc.).

The aerial image retrieval tool 122 of the underwriting server 120 may access and/or receive data from one or more sources via the computer network 106, such as a high resolution image database 126, a satellite image database 128, one or more internet sources 130, etc. The high resolution database 126 may include a data storage device such as random-access memory (RAM), hard disk drive (HDD), flash memory, flash memory such as a solid state drive (SSD), etc. Similarly, the satellite image database 128 may include a data storage device such as random-access memory (RAM), hard disk drive (HDD), flash memory, flash memory such as a solid state drive (SSD), etc. In some embodiments, the high resolution image database 126 and the satellite image database 128 may be third party databases, such as a private or a public database. The third party database may be offered, for example, by a third party vendor. In some embodiments, the high resolution image database 126 and the satellite image database 128 may be included in the back end components 108 and/or the quote system 110 and may also be accessed by the aerial image retrieval tool 122 via the communication network 106.

The aerial image analysis tool 124 may analyze one or more images retrieved from the high resolution image database 126, the satellite image database 128, internet source 130, etc. As will be discussed below in reference to FIGS. 3-7, the aerial image analysis tool 124 may perform a variety of analysis, such as identifying one or more data objects, translating one or more data objects, etc.

The underwriting server 112 may send and receive information such as computer-executable instructions and data associated with applications executing on the computing device 104. The applications executing within the system 100 may include cloud-based applications, web-based interfaces to back end components 108, software applications executing on the computing device 104, or applications including instructions that are executed and/or stored within any component of the system 100. The back end components 108 may receive, via the computer network 108, a file, such as a high resolution image 126a from the high resolution database 126, satellite image 128a from a satellite image database, etc. The backend components 108 may communicate with the computing device 104 through the underwriting server 110 via the computer network 106. The applications, web browser application, and other tools may be stored in various locations, including separate repositories and physical locations.

Figure 2:
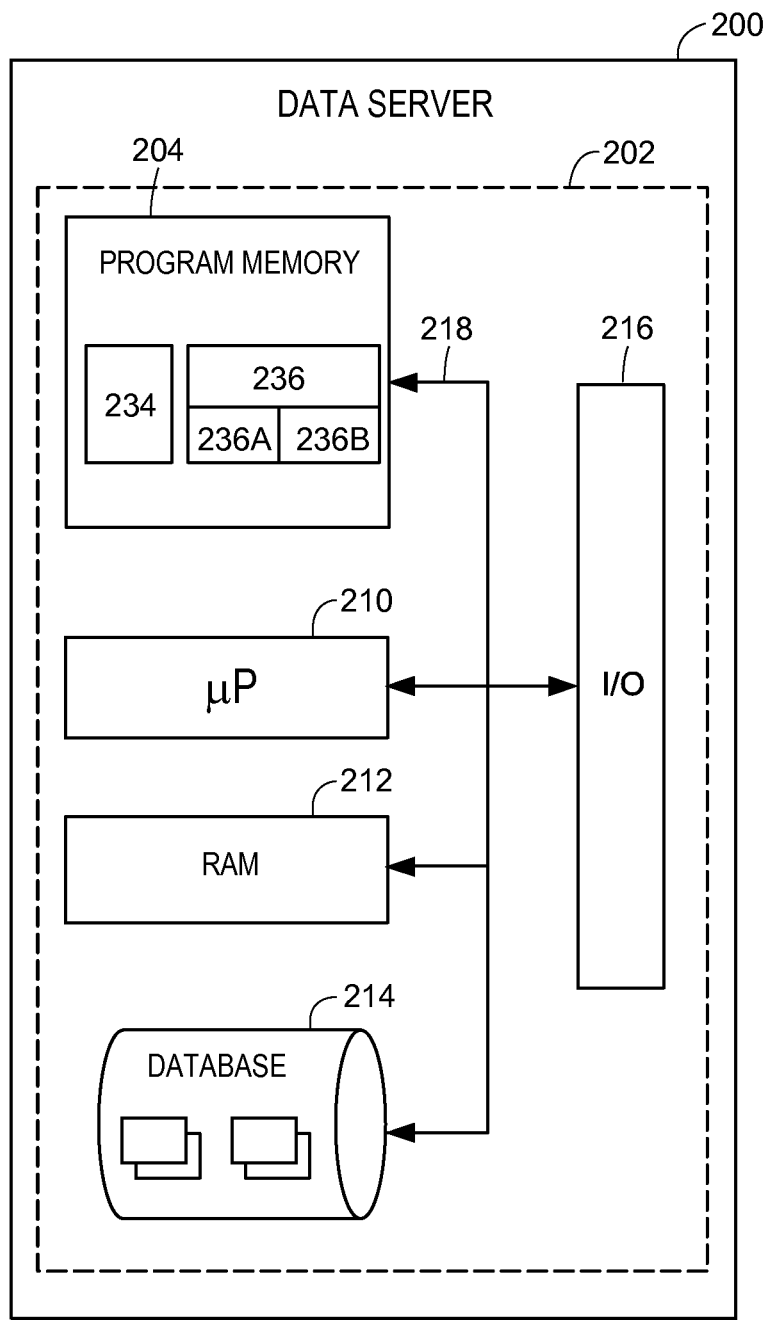
FIG. 2 is an exemplary architecture of server of a system for virtual inspection of a structure.

Referring now to FIG. 2, a data server 200 includes a controller 202. Exemplary data servers include the underwriting server 112 illustrated in FIG. 1. The controller 202 includes a program memory 204, a microcontroller or a microprocessor (W) 210, a random-access memory (RAM) 212, and an input/output (I/O) circuit 216, all of which are interconnected via an address/data bus 218. The program memory 204 may store computer-executable instructions, which may be executed by the microprocessor 210. In some embodiments, the controller 202 may also include, or otherwise be communicatively connected to, a database 214 or other data storage mechanism (e.g., one or more hard disk drives, optical storage drives, solid state storage devices, etc.). It should be appreciated that although FIG. 2 depicts only one microprocessor 210, the controller 202 may include multiple microprocessors 210. Similarly, the memory 204 of the controller 202 may include multiple RAMs 234 and multiple program memories 236, 236A and 236B storing one or more corresponding application modules, according to the controller's particular configuration. The data server 200 may also include specific routines to be performed by the data server 200.

Although FIG. 2 depicts the I/O circuit 216 as a single block, the I/O circuit 216 may include a number of different types of I/O circuits (not depicted). The RAM(s) 212, 234 and the program memories 236, 236A and 236B may be implemented in a known form of computer storage media, including but not limited to, semiconductor memories, magnetically readable memories, and/or optically readable memories, for example, but does not include transitory media such as carrier waves.

Figure 3:
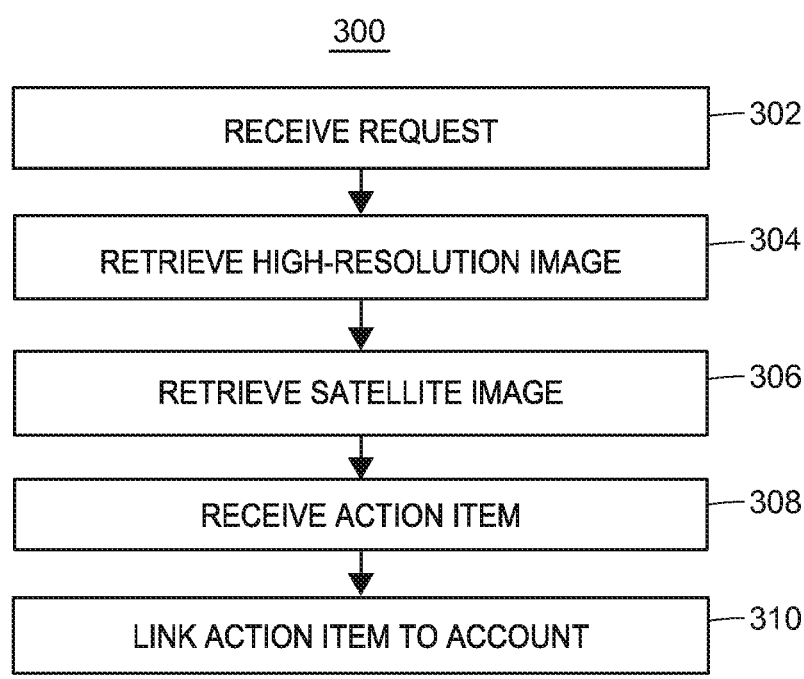
FIG. 3 is flow chart illustrating a method for linking an action item to a customer account.

FIG. 3 is a high level flow chart of a method, routine or process 300 for linking an action item to a customer account, such as an insurance account, customer account with a company, etc. A company employee, such as an underwriter, an insurance agent with the company or some other employee or independent contractor affiliated with the company, may use a client device, such as the computing device 108 illustrated in FIG. 1 to access a company server 122. The company server may be accessed via a company website, mobile application, desktop application, etc. The company website may be hosted on one or more servers, such as the server 122, described in reference to FIG. 1.

For each employee, underwriter, etc., the server may store one or more work queues, including different applications that the employee is working on, needs to complete, etc. The employee may enter an input, via a mouse click, touch press, etc., representing the work queue item to be selected. For example, the employee may select an insurance product for a structure, such as a house. In response to receiving the input representing the selection of an application to be processed (block 302), the server may execute an instruction to begin the process. A processor of the server may execute one or more instructions to retrieve a high resolution image corresponding to the structure (block 304). For example, the instruction may access the high resolution database 126 described in reference to FIG. 1. The processor of the server may also execute one or more instructions to retrieve a satellite image corresponding to the structure (block 306). For example, the instruction may access the satellite database 128 described in reference to FIG. 1. The processor may also receive an action item (block 308) and execute an instruction to link the action item to a customer account (block 310).

Figure 4:
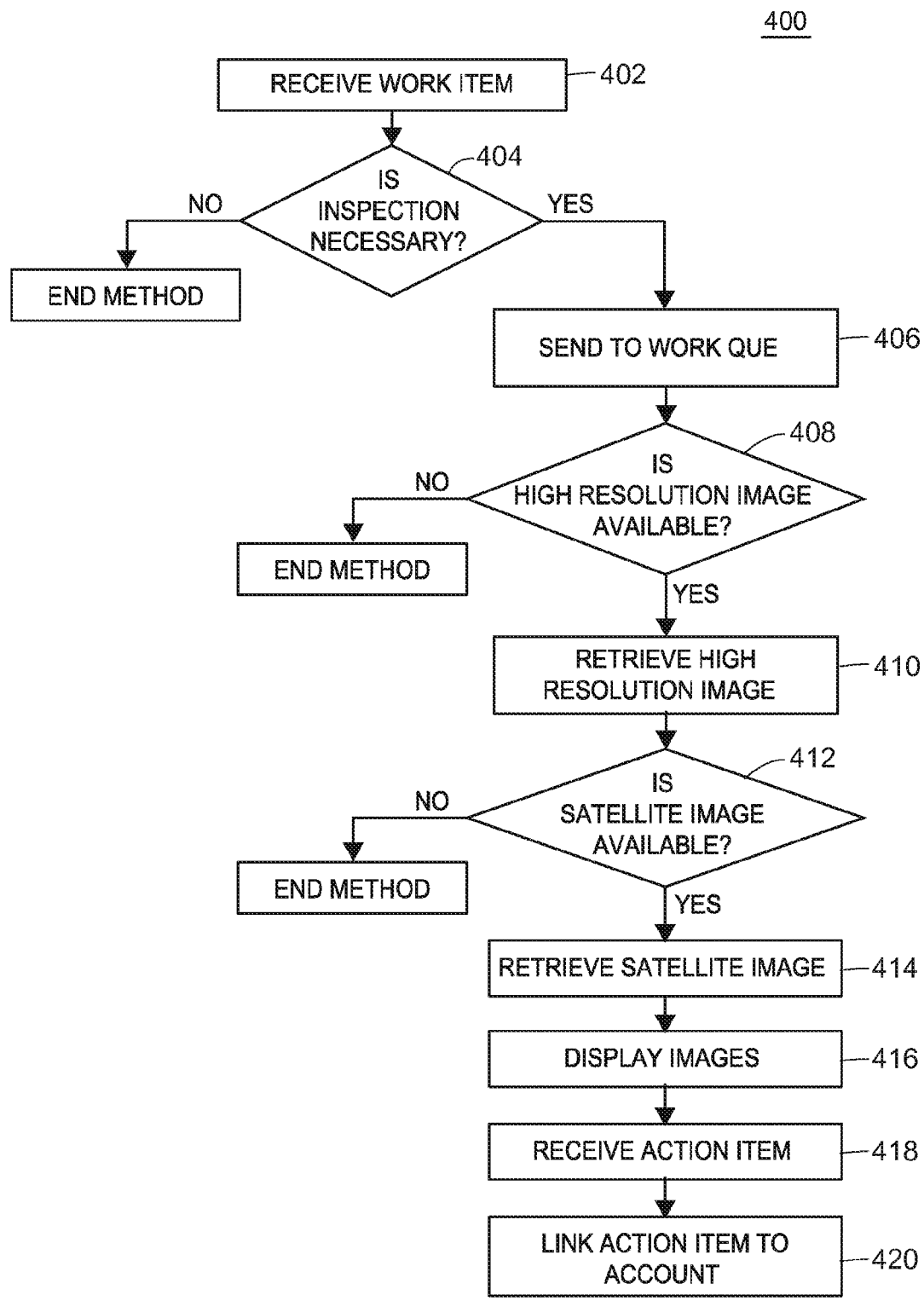
FIG. 4 is a flow chart illustrating a method for virtual inspection of a structure.

FIG. 4 is a flow chart of a method, routine or process 400 for virtual inspection of a structure. As discussed above in reference to FIG. 3, the underwriting process for an insurance product may include retrieving and analyzing an aerial image. The method 400 may be used during the underwriting process, such as the quote application process 300 described in reference to FIG. 3, though those skilled in the art will recognize that the method 400 can be used in a variety of different price quote application processes for insurance products.

The processor of a server, such as the server 112, illustrated in FIG. 1, may select a work item (block 402) and execute an instruction to determine whether or not a virtual inspection is necessary for the work item (block 404). For example, the processor may execute an instruction to process the request through an inspection model. If the processor executing the instruction determines that an inspection is not necessary (NO branch of block 404), then the method 400 may end. If the processor executing the instruction determines that an inspection is necessary, the server may send the work item to an underwriter's work queue (block 406). In some embodiments the underwriter may additionally or alternatively review the work item and determine whether an actionable item is necessary and/or an inspection is necessary.

The processor of the server may execute an instruction to determine if a high resolution image is available (block 408). If a high resolution image for the structure is not available (NO branch of block 408), the processor may execute an instruction to end the method 400. In some embodiments, the processor may execute an instruction to order a physical inspection. For example, a request may be sent to an agent's work queue to perform a physical inspection of the structure and/or property. If the processor executing the instruction determines that an aerial image for the structure is available, (YES branch of block 408) the processor may execute an instruction to retrieve the aerial image for the structure (block 410). The processor may access a company database, such as the database 116 or 118 illustrated in FIG. 1, an aerial image database, such as the high resolution image database, 126 illustrated in FIG. 1, an internet source, such as the internet source 130 described in FIG. 1, etc. In some embodiments, the company may use a database or other source maintained by the company, while in other embodiments the server may access a database that is maintained by a third party.

The processor of the server may also execute an instruction to determine if a satellite image is available (block 412). If the processor executing the instruction determines that an aerial image for the structure is available, (YES branch of block 412) the processor may execute an instruction to retrieve the satellite image for the structure (block 414). The processor may access a company database, such as the database 116 or 118 illustrated in FIG. 1, an aerial image database, such as the high resolution image database, 126 illustrated in FIG. 1, an internet source, such as the internet source 130 described in FIG. 1, etc. In some embodiments, the company may use a database or other source maintained by the company, while in other embodiments the server may access a database that is maintained by a third party. In some embodiments, the processor may also execute an instruction to order a virtual inspection on demand, if an image is not available. If a high resolution image for the structure is not available (NO branch of block 412), the processor may execute an instruction to end the method 400.

In some embodiments, the satellite image may fall within a certain time threshold. For example, the time threshold may be 72 hours, though other time thresholds may be used. This allows the underwriter to have access to recent data and make more accurate decisions. In some embodiments, the processor may execute one or more instructions to determine and/or confirm that the satellite image meets the time/quality threshold.

The processor may also execute an instruction to display the images (block 416). In some embodiments, rather than execute an instruction to display the image, the processor may execute an instruction to transmit the images to the client computing device for display. Once displayed, the underwriter may view the images and make any necessary decisions. The underwriter may input any action items based on the high resolution and/or satellite image. The processor executing the instruction may receive the action item (block 418) and link the action item to the customer account corresponding to the selected structure (block 420).

There are numerous action items and determinations which the underwriter may make using the presented system. Furthermore, the underwriter can view the images and determine certain objective and/or subjective categories. Objective categories may include whether the property in question is being used for a legal purpose and/or the purpose which the customer has claimed. Certain locations may be licensed for commercial activity, rental activity, etc. Other objective categories include number of stories of a structure, whether or not certain objects appear on the property or in the surrounding area, such as fire hydrants, garage, fences, pools, distance to coast, etc. The underwriter may also determine characteristic data corresponding to the objects. For example, the underwriter may determine the material that a roof is made out of or whether a pool is above ground or below ground. Subjective categories may include pride of ownership such as housekeeping, damage to one or more structures on the property (i.e. hail damage), whether there is a liability concern on the property or nearby, whether any part of the structure on the property is in need of repair.

Figure 5:
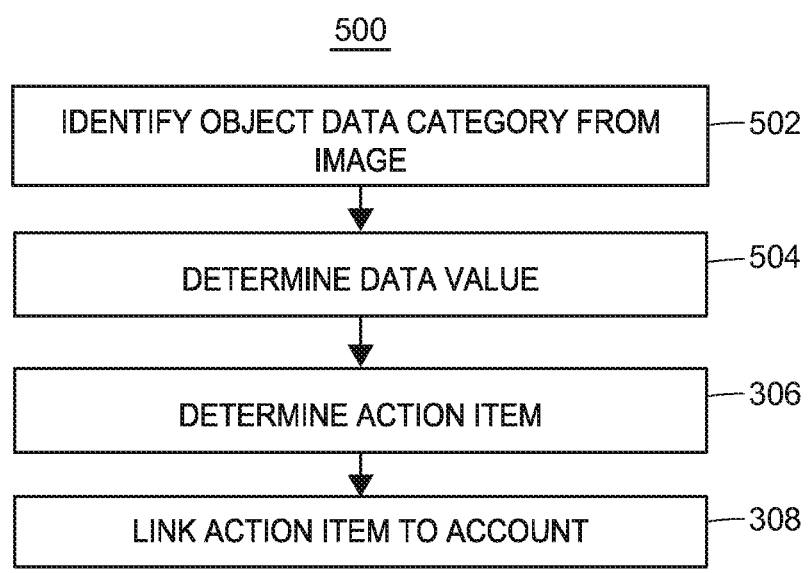
FIG. 5 is a flow chart illustrating a method for intelligent aerial image data analysis determining a best aerial image data source.

FIG. 5 is a flow chart of a method, routine or process 500 for intelligent aerial image data analysis. As discussed above in reference to FIG. 4, during the underwriting process, an underwriter may determine one or more action items corresponding to a structure. In some embodiments, an automated processor for intelligent aerial image data analysis may be used to determine one or more action items. A processor of the server may execute an instruction to identify one or more object data categories from a retrieved image (block 502), such as the satellite image and/or high resolution image. The processor may further execute an instruction to determine one or more data values corresponding to the object data categories (block 504). The processor may also execute an instruction to identify one or more action items (block 506) based at least on the object data categories and/or data values and link the action item to the customer account (block 508). In some embodiments, the processor may also incorporate one or more business rules into the instruction. For example, a business rule may specify that if the structure includes a roof made of shingles, that an action item must be linked to a customer account. In some embodiments the processor may also execute an instruction to take one or more potential actions.

As a general example, the image retrieved may be of a structure such as a home. Accordingly, the processor may execute an instruction to analyze the image and translate the object data categories. Exemplary data categories include a roof, a pool, garage, fence, etc. Once the data category has been identified, the processor may execute an instruction to determine one or more object data values corresponding to the data category. In the roof example, the object data value may correspond to the roofing material and include, for example, shingles, slate, ceramic tile, copper, concrete, etc. Another value may correspond to a quality of the roof and/or roofing material and may be on a scale of 1-10, a percentage, or some other value. If the identified data category is a pool, the data values identified may be the type of pool, such as if the pool is in-ground, above ground, the approximate size of the pool, etc. The object data values may be objective data, such as whether an object data (such as a pool) is present, or a subjective value, describing the pool (in-ground, above ground, etc.). The object data categories and values may also be structured data retrieved from the image file, such as geocoded data, etc. Of course these are just examples and the data categories can be any of a wide variety of objects, etc. For example, if the structure is a commercial building, the object data categories may include a drive way, a parking garage, or other structure, fire hydrant, etc.

Figure 6:
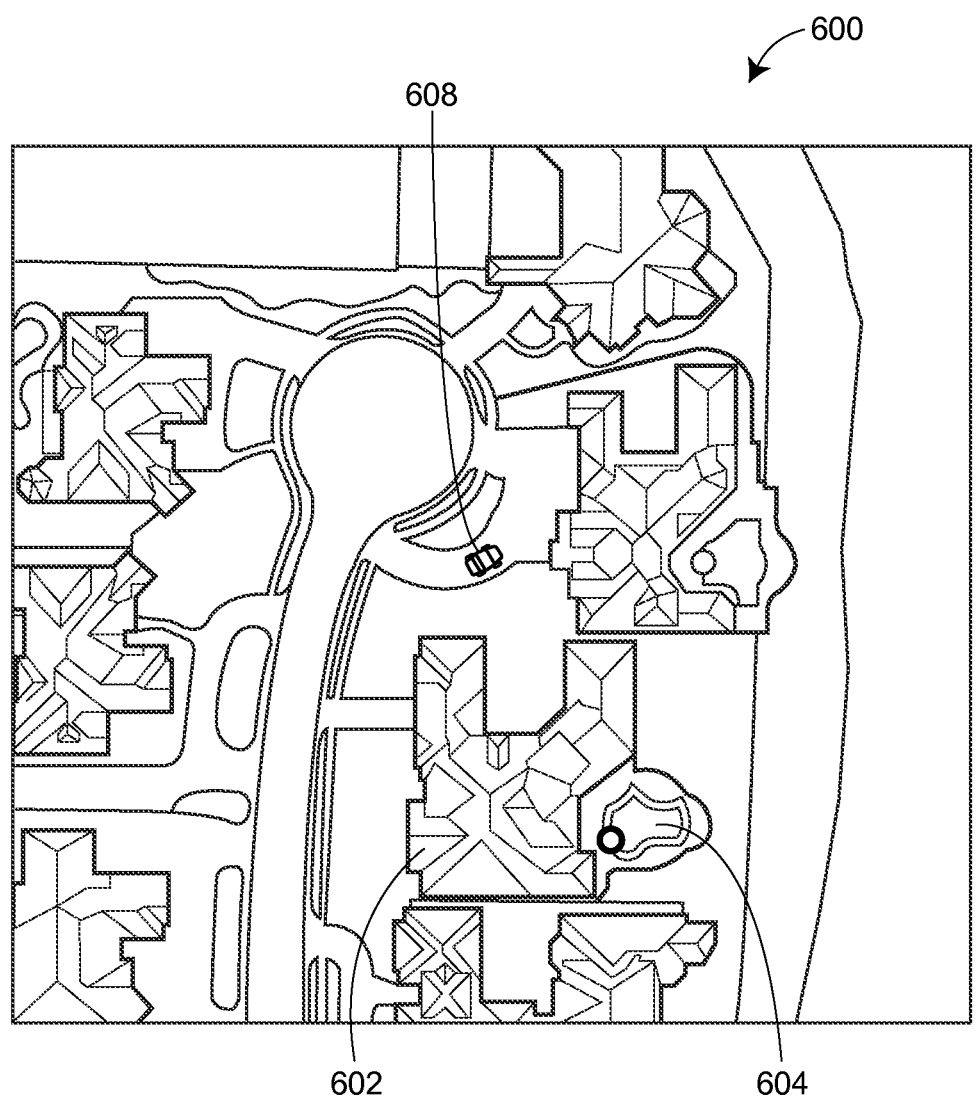
FIG. 6 is an exemplary aerial image.

Turning briefly to FIG. 6, a sample aerial image 600 is provided. The processor executing the instructions may identify one or more object data categories, such as a house 602, a pool 604 and a garage 606. Of course these are just example object data categories and in some embodiments other data categories may be used. Furthermore, the processor executing the instructions may determine a data value for one of the identified object data categories. As one example, the processor executing the instruction may determine that data value for the pool 604, is that the pool is an in-ground pool. Of course this is just one example, and the methods provided can be used with any variety of aerial images, data values and data categories, etc.

Figure 7:
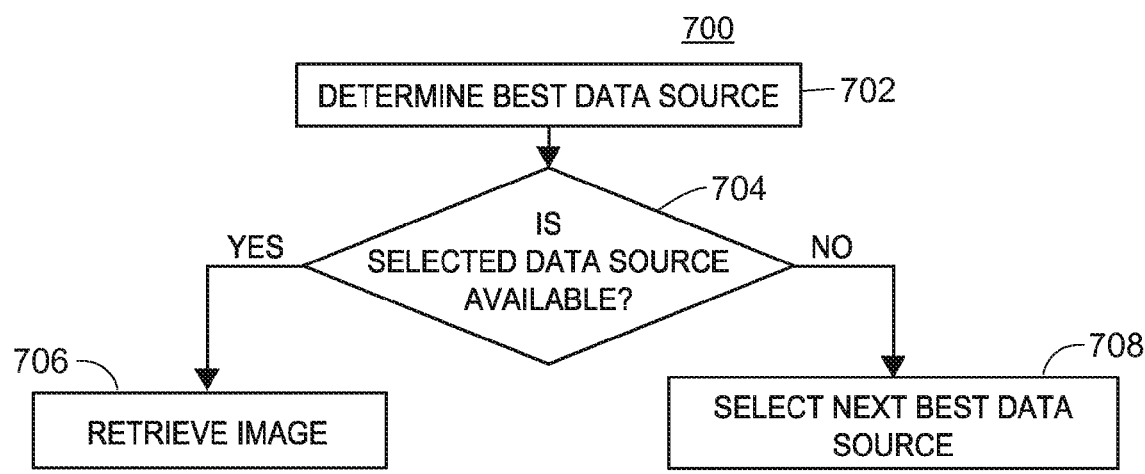
FIG. 7 is a flow chart illustrating a method for determining if two or more objects in an image are within a threshold distance of each other.

FIG. 7 is a flow chart of a method, routine or process 700 for determining a best image data source. In some embodiments, multiple data sources for images may exist. For example, the server 122 may have access to one or more databases, including third party databases from multiple sources and/or one or more additional sources, such as the databases 116, 118, 126, 128, internet source 130, discussed in reference to FIG. 1. The processor may execute an instruction to determine the best data source (block 702). This may be done in a variety of ways. For example, the processor may execute an instruction to retrieve at least one image from each of the available data sources and to determine one of more characteristics of the image files retrieved, such as resolution, file format, etc. In some embodiments, one or more of the aerial image files and/or sources may be graded based on reliability or quality. In some embodiments, the server may store previous determinations and view the photos to execute an instruction to determine which is the best source available based on previous decisions.

Nonetheless, once the processor executing the instructions determines the best data source, the processor may execute an instruction to determine if the best data source is available for the desired structure (block 704). If the best data source is available for the desired structure, (YES branch of block 704), the processor may execute an instruction to retrieve one or more aerial images from the data source (block 706).

If the processor executing the instruction determines that the best data source is not available for the desired structure (NO branch of block 704), the processor may execute an instruction to select the next best data source (block 708) and determine whether the select data source is available for the structure (block 704). The processor may continue to execute instructions incorporating the method until a suitable source is found. In some embodiments, the processor may end the method 700 after a certain number of sources, certain amount of time, etc.

Figure 8:
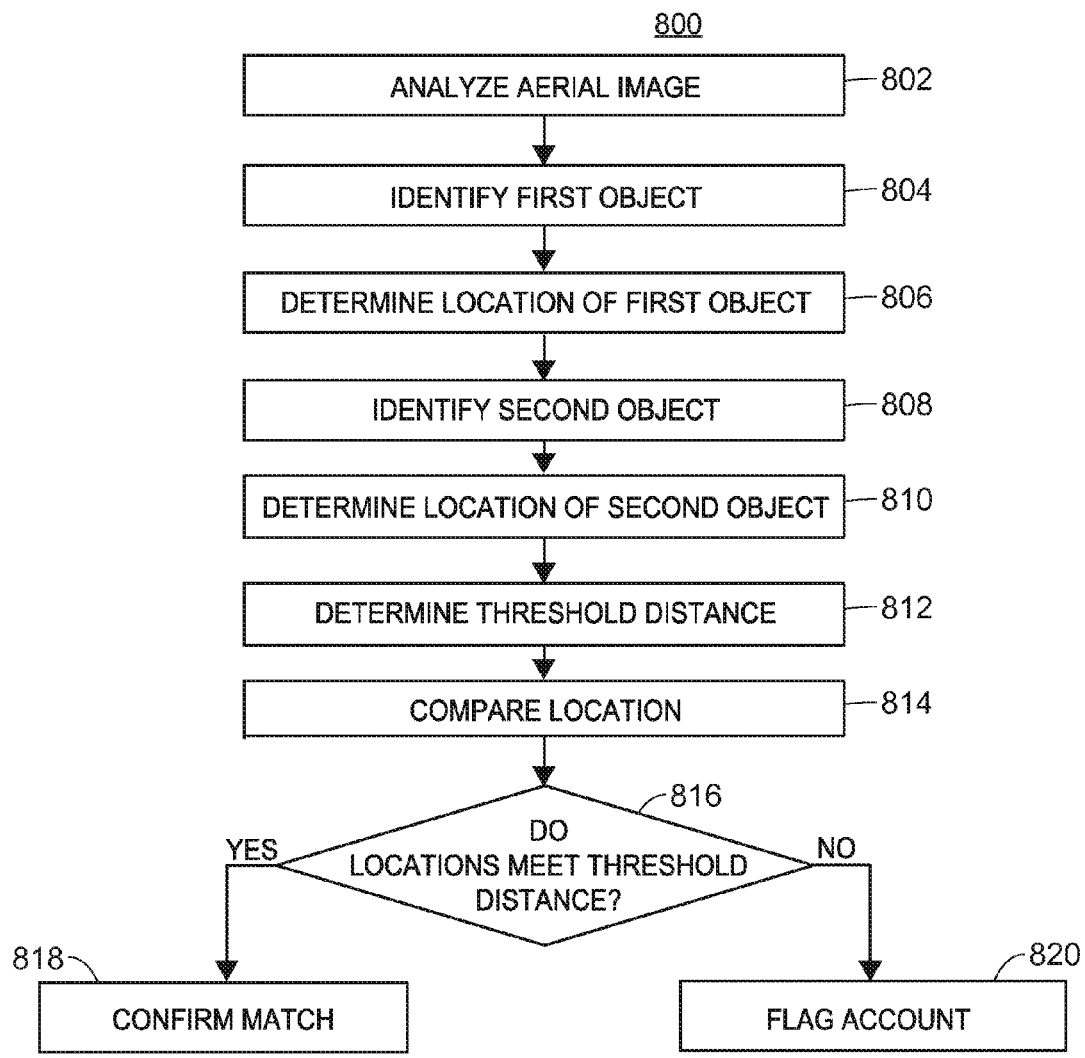
FIG. 8 is a flow chart illustrating an exemplary method for identifying one or more objects in an aerial image.

FIG. 8 is a flow chart of a method, routine or process 800 for determining if two or more objects in an image are within a threshold distance of each other. In some embodiments, an aerial image may have one or more relevant objects present. For example, in determining an insurance quote for a home, it may be relevant to the underwriter that the structures includes a pool in the backyard, a garage, a fence, a nearby fire hydrant, a nearby fire station, a nearby police station, home built on a slope or hilltop etc. The processor may execute an instruction to analyze the aerial image (block 802), identify a first object (block 804) and determine the location of the first object (block 806). The instruction executed by the processor may incorporate one or more image identifying techniques as are known on the art. The processor may further execute an instruction to identify a second object (block 808) and determine the location of the second object (block 810). In some embodiments, the first object and second object may correspond to one or more of the object data categories determined by the method 800, discussed above in reference to FIG. 8. Furthermore, although this discussion only mentions a first and a second object, those of ordinary skill in the art will recognize that the method 800 can involve any number of identified object data.

The processor may execute an instruction to determine a threshold distance (block 812), compare the locations of the first and second object (block 814) and determine if the locations meet the threshold distance (block 816). If the processor determines that the location meets the distance threshold, the processor executing the instruction may confirm the match (block 818). If the processor determines that the location does not meet the threshold distance, the processor executing the instruction may flag the customer account (block 820). In some embodiments, the processor may also use the confirmation to determine one or more answers for questions in the quote process and auto-populate a form corresponding to the quote process, such as an online form for an online quote process executing on a client device. The server may also execute an instruction to transmit the information to the client device for presentation, confirmation, etc.

For example, a processor of the server may execute an instruction incorporating the method 800 to determine if a fire station is within a threshold distance of a home. A customer may wish to receive a quote on a home insurance product, but a business rule may determine that a certain additional premium is to be charged if the customer's home is not within a threshold distance, for example five miles, of a fire station or determine the risk is unacceptable. Accordingly, the processor may execute an instruction to analyze the aerial image and identify a first object, such as the home structure itself. The processor may further execute an instruction to identify a second object, such as the fire station. The processor may then execute an instruction to compare the distances of the home structure and the fire station and determine whether or not the fire station is within the threshold distance of the home structure. Of course this is only an example for demonstration purposes, and the method 800 can be used with any variety of objects and/or threshold distances.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 104, the server 112, or any combination of computing devices within the system 100). The routines may be included as part of any of the modules described in relation to FIG. 1 or 2 or as part of a module that is external to the system illustrated by FIGS. 1 and 2. For example, the methods may be part of a browser application or an application running on the computing device 104 as a plug-in or other module of the browser application. Further, the methods may be employed as "software-as-a-service" to provide a computing device 104 with access to the quote system 110.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for intelligent aerial image data processing. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer implemented method, comprising:
receiving, via a computer network, an inspection model, wherein the inspection model corresponds to a geographic location associated with a structure;
determining, at one or more processors, that a virtual inspection is necessary based on the inspection model;
retrieving, via the computer network, an aerial image, wherein the aerial image corresponds to the geographic location;
analyzing, at the one or more processors, the aerial image to (i) identify a first object and a second object within the aerial image and (ii) determine a distance between the first object and the second object, wherein
identifying the first object includes (i) identifying a first object data category corresponding to the first object, and (ii) determining an objective or subjective data value descriptive of the first object and corresponding to the first object data category, and
identifying the second object includes (i) identifying a second object data category corresponding to the second object and different than the first object data category, and (ii) determining an objective or subjective data value descriptive of the second object and corresponding to the second object data category;
determining, at the one or more processors, that the distance between the first object and the second object is within a threshold distance; and
based on the determining that the distance between the first object and the second object is within the threshold distance, flagging, at the one or more processors, a customer account that is associated with the geographic location.

2. The computer implemented method of claim 1, wherein retrieving the aerial image comprises:
accessing, via the computer network, one or more aerial image databases; and
determining, at the one or more processors, that at least one of the one or more aerial image databases contains an aerial image corresponding to the geographic location.

3. A computer device, comprising;
one or more processors; and
one or more memories coupled to the one or more processors;
wherein the one or more memories include computer executable instructions stored therein that, when executed by the one or more processors, cause the one or more processors to:

receive, via a computer network, an inspection model, wherein the inspection model corresponds to a geographic location associated with a structure;
determine that a virtual inspection is necessary based on the inspection model;
retrieve, via the computer network, an aerial image, wherein the aerial image corresponds to the geographic location;
analyze the aerial image to (i) identify a first object and a second object within the aerial image and (ii) determine a distance between the first object and the second object, wherein
identifying the first object includes (i) identifying a first object data category corresponding to the first object, and (ii) determining an objective or subjective data value descriptive of the first object and corresponding to the first object data category, and
identifying the second object includes (i) identifying a second object data category corresponding to the second object and different than the first object data category, and (ii) determining an objective or subjective data value descriptive of the second object and corresponding to the second object data category;
determine that the distance between the first object and the second object is within a threshold distance; and
based on the determining that the distance between the first object and the second object is within the threshold distance, flag a customer account that is associated with the geographic location.

4. The computer device of claim 3, wherein to retrieve the aerial image, the computer executable instructions further cause the one or more processors to:
access, via the computer network, one or more aerial image databases; and
determine that at least one of the one or more aerial image databases contains an aerial image corresponding to the geographic location.

5. A non-transitory computer readable storage medium comprising non-transitory computer readable instructions stored thereon, the instructions when executed on one or more processors cause the one or more processors to:
receive, via a computer network, an inspection model, wherein the inspection model corresponds to a geographic location associated with a structure;
determine that a virtual inspection is necessary based on the inspection model;
retrieve, via the computer network, a first aerial image, wherein the first aerial image corresponds to the geographic location;
analyze the aerial image to (i) identify a first object and a second object within the aerial image and (ii) determine a distance between the first object and the second object, wherein
identifying the first object includes (i) identifying a first object data category corresponding to the first object, and (ii) determining an objective or subjective data value descriptive of the first object and corresponding to the first object data category, and
identifying the second object includes (i) identifying a second object data category corresponding to the second object and different than the first object data category, and (ii) determining an objective or subjective data value descriptive of the second object and corresponding to the second object data category;

determine that the distance between the first object and the second object is within a threshold distance; and based on the determining that the distance between the first object and the second object is within the threshold distance, flag a customer account that is associated with the geographic location.

6. The non-transitory computer readable storage medium of claim 5, wherein to retrieve the aerial image, the instructions when executed on the one or more processors further cause the one or more processors to:

access, via the computer network, one or more aerial image databases; and determine that at least one of the one or more aerial image databases contains an aerial image corresponding to the geographic location.

* * * * *